United States Patent Office 3,096,820
Patented July 9, 1963

3,096,820
SUPERIOR WATER-FLOODING PROCESS
George G. Bernard, Crystal Lake, Ill., assignor to The Pure Oil Company, Chicago, Ill., a corporation of Ohio
No Drawing. Filed Nov. 16, 1959, Ser. No. 852,962
11 Claims. (Cl. 166—9)

This invention relates to a method for producing increased quantities of oil from subterranean formations by the injection of surfactant-containing water into the formation. This invention is further directed to a superior water-flooding process whereby substantial increases in the intake capacities of water-injection wells are achieved.

It is recognized by the art that the addition of surface-active materials to floodwater prior to injection into the formation makes possible the production of greater quantities of oil than can be obtained by the injection of plain water or brine. It is further known that surface-active materials added to floodwater serve to increase the permeability of the formation surrounding the injection well. The addition of various surfactant agents to floodwater has therefore been proposed.

It has now been discovered that two particular types of surfactant agents, each of which individually is an excellent floodwater additive, when used together in floodwater, produce a synergistic result. Thus, unexpectedly large oil recoveries are obtained, and further, the permeability of the treated formation is improved by a factor of as much as 4 times the improvement obtainable by using an equal quantity of either surfactant individually.

It is an object of this invention to provide an improved surfactant water-flood process for the recovery of oil from subterranean formations.

It is another object of this invention to provide an improved water-flood process by which the permeability of the formation in the zone surrounding a water-injection well is substantially improved during the water-injection process.

The method of this invention consists of injecting a quantity of floodwater containing a small concentration of a surfactant which is the condensation product of a fatty acid having 8 to 18 carbon atoms and diethanolamine, and then injecting a quantity of floodwater containing a small amount of an alkaryl polyether alcohol surfactant of the formula,

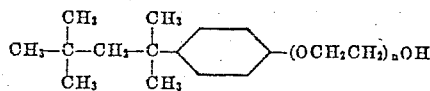

wherein $n$ is an integer in the range of 7 to 13, inclusive.

The results are far superior to those obtained when using either surfactant alone, and to the additive results which would be expected from using the surfactants in sequence. Still further improvements in oil recoveries and in the permeability of the formation can be obtained by including in the first quantity of floodwater, in combination with the fatty acid-diethanolamine condensation product, a small quantity of the diethanolamine salt of benzene sulfonic acid. The addition of the sulfonic acid salt results in an improvement when the method of this invention is carried out on some crude oils.

As an alternative method of practicing this invention, a small amount of the fatty acid-diethanolamine surfactant and of the alkaryl polyether alcohol surfactant may be added to the same quantity of floodwater. This alternative method is particularly adapted to situations in which the primary purpose of the surfactant is to improve the water-acceptance rates of the injection wells, rather than to increase the quantity of oil removed from the reservoir by the floodwater.

It is preferred that the fatty acids with which the diethanolamine is condensed be coco fatty acids which occur in coconut oil. A surfactant of this composition is marketed by Swift and Company under the name of "Solar CO." Preparation of this surfactant is described in U.S. Patent 2,586,496, Example 2. As before stated, it is preferred in some instances to include with the fatty acid-diethanolamine condensation product a small amount of the diethanolamine salt of benzene sulfonic acid. Swift and Co. markets a surfactant mixture containing about 75% coco fatty acid-diethanolamine condensation products and about 25% diethanolamine salt of benzene sulfonic acid under the trade name of Solar 25. The isooctyl phenyl polyether ethanol, which is added to the second quantity of floodwater, should contain 7 to 13 ethylene oxide groups, and preferably contains 9 or 10 ethylene oxide groups. Triton X-100 is a commercially known mixture of isooctyl phenyl polyethoxy ethanols having 9 and 10 ethylene oxide groups.

The effectiveness of the method of this invention was demonstrated by the following experimental procedure. Alundum cores having a porosity of about 25% and a permeability of 250 millidarcys were saturated with a brine comprising 5% sodium chloride and 0.5% calcium chloride, and were driven to minimum brine saturation with one of several selected crude oils. The cores were then flooded with brine until oil production ceased, that is, until the cores became watered out. The watered out cores were then flooded with brine containing 0.01% of the selected surfactants, or sequentially with quantities of brine containing first one selected surfactant and then the other. In each case, the surfactant concentration in the brine was 0.01%. Experimental results are set out in Table I.

TABLE I

| Surfactant | Crude Oil | Initial Oil Saturation, Percent Pore Vol. | Oil Saturation After Water Flood, Percent Pore Volume | Oil Saturation After Surfactant Flood, Percent Pore Volume | Oil Produced by Surfactant, Percent of Residual | Permeability Increase, Percent |
|---|---|---|---|---|---|---|
| Triton X-100 | Platte West Texas | 78.0 | 24.1 | 22.2 | 7.9 | 9 |
| Solar 25 | do | 77.8 | 24.8 | 10.4 | 58.0 | -9 |
| Solar 25—Triton X-100 | do | 79.5 | 29.0 | 1.0 | 96.6 | 45 |
| Triton X-100 | McClosky | 80.3 | 26.0 | 25.1 | 3.5 | 13 |
| Solar 25 | do | 78.7 | 22.2 | 16.6 | 27.0 | 7 |
| Solar 25—Triton X-100 | do | 79.7 | 27.5 | 6.3 | 74.4 | 94 |
| Triton X-100 | Aux Vases | 78.4 | 25.8 | 23.5 | 8.9 | 42 |
| Solar 25 | do | 79.4 | 29.8 | 14.2 | 52.3 | 36 |
| Solar 25—Triton X-100 | do | 77.3 | 24.2 | 13.6 | 43.8 | 124 |
| Triton X-100 | West Texas Sour | 78.3 | 28.1 | 23.5 | 16.4 | 5 |
| Solar CO | do | 78.0 | 27.6 | 12.0 | 56.5 | -17 |
| Solar CO—Triton X-100 | do | 77.1 | 29.3 | 3.9 | 86.7 | 116 |

Where a single surfactant is listed under the "Surfactant" column heading, the flood was carried out using 1200 cc. of surfactant-brine solution. Where two surfactants are listed on the same line, 400 cc. of brine containing the first-named surfactant was first injected into the core, and was followed by 400 cc. of brine containing Triton X–100. In each case, the pore volume of the core was about 15 cc.

In the experiments set out in Table II Berea sandstone cores were used. Where two surfactants are listed on the same line in Table II, 0.005% of each of the two named surfactants, for a total surfactant concentration of 0.01%, was used. In each instance in Table II, 150 pore volumes of surfactant solution were injected.

TABLE II

| Surfactant | Crude Oil | Pore Volumes of Solution | Percent Increase in Permeability |
|---|---|---|---|
| Triton X–100 | West Texas Sour | 150 | 38 |
| Solar CO | do | 150 | 70 |
| Solar 25 | do | 150 | 49 |
| Solar CO+Triton X–100 | do | 150 | 183 |
| Solar 25+Triton X–100 | do | 150 | 100 |
| Triton X–100 | Adena | 150 | 29 |
| Solar CO | do | 150 | 31 |
| Solar 25 | do | 150 | −4 |
| Solar CO+Triton X–100 | do | 150 | 51 |
| Solar 25+Triton X–100 | do | 150 | 126 |
| Triton X–100 | Bonanza | 150 | 28 |
| Solar CO | do | 150 | 10 |
| Solar 25 | do | 150 | −14 |
| Solar CO+Triton X–100 | do | 150 | 103 |
| Solar 25+Triton X–100 | do | 150 | 54 |

The data in Table I clearly establishes that outstanding improvements in both oil recovery and core permeability were obtained by using the same total surfactant concentration and following the method of this invention. Furthermore, these improved results were obtained by the injection of a smaller total quantity of floodwater, since 1200 cc. of the single surfactant solutions were injected and 400 cc. of each of two surfactant solutions were injected where two surfactants were used. The data of Table II clearly establish that improvements in core permeability are obtained when the injected surfactant solution contains both the fatty acid diethanolamine and alkaryl polyether alcohol surfactants. While the results obtained by mixing the surfactants in the same quantity of floodwater are less startling than those obtained by using the sequential injection of two quantities of floodwater, each quantity containing one of the two named surfactant classes, still the data of Table II show a substantial improvement over the use of a single surfactant alone.

Where two separate batches of surfactant-containing floodwater are to be sequentially injected, which is the preferred method of carrying out the process of this invention, surfactant concentrations of about 0.0001 to 0.100% in the floodwater are effective in both steps of the process, but concentrations of about 0.005 to 0.050% appear to be most economical. The quantities of surfactant-containing water injected do not appear to be critical to the success of the process, but because the restriction to water intake at an injection well has its greatest effect in the zone immediately surrounding the injection well, that is, up to about a radial distance of 5 feet, it is preferred that the volumes of solutions injected be related to these zones. It is advantageous to inject first and second batches of surfactant-containing floodwater, which batches have a volume equal to about 50 times the volume of the reservoir pores within a radius of about 5 feet from the injection well.

Where both surfactants are to be incorporated in the some batch of floodwater, surfactant concentrations totalling about 0.001 to 0.100% in the floodwater are effective, but concentrations of about 0.005 to 0.050% appear to be the most economical. The two surfactants may be present in concentration ratios ranging from about 10 to 1 to 1 to 10, but it is preferred to use ratios of about 2 to 1 to 1 to 2.

As a specific example of the method of this invention, a subterranean reservoir containing connate brine and crude oil is produced by injecting through an input well and into the formation 0.1 reservoir pore volume of floodwater in which is dissolved 0.01% by weight of the condensation product of coco fatty acids and diethanolamine, then injecting through the input well and into the formation an equal volume of floodwater in which is dissolved 0.01% by weight of isooctyl phenyl nonaethoxy ethanol. Reservoir fluids are produced from the reservoir through an output well. After the injection of the second batch of floodwater is completed, a third batch of floodwater identical with the first is then injected, and so forth, alternating the kinds of surfactant dissolved in the floodwater batches until the water-to-oil ratio at the producing well reaches an uneconomically high level, at which point the process is terminated.

As another example of the method of this invention, petroleum oil is produced from a subterranean reservoir by injecting through an input well and into the reservoir floodwater in which is dissolved 0.005% by weight of a surfactant mixture of 75% condensation product of coco fatty acids and diethanolamine and 25% diethanolamine salt of benzene sulfonic acid; and 0.005% by weight of isooctyl phenyl decaethoxy ethanol. Reservoir fluids are produced from an output well until the water-to-oil ratio at the output well reaches an uneconomically high level. At this point, the production of oil and the injection of floodwater is terminated.

The embodiments of the invention in which an exclusive property or privilege is claimed are defined as follows:

1. In the recovery of petroleum oil from the subterranean formation by the injection of floodwater through an input well and into said formation and the production of oil from said formation through an output well, the improvement comprising incorporating in at least a portion of said floodwater condensation products of fatty acids and diethanolamine, wherein the fatty acids contain 8 to 18 carbon atoms, and incorporating in at least a portion of said floodwater an alkaryl polyether alcohol of the formula

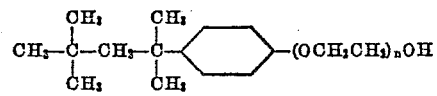

wherein $n$ is an integer in the range of 7 to 13, the concentration of the compounds in said floodwater being about 0.001 to 0.100% by weight.

2. A method according to claim 1 in which the first-named compounds and the second-named compounds are present in the same portions of the floodwater.

3. A method according to claim 2 in which said first-named and second-named compounds are present in the floodwater in concentration ratios ranging from about 10:1 to 1:10.

4. A method according to claim 2 in which between 0.005 and 0.050% total weight of said compounds is incorporated in said floodwater.

5. A method according to claim 2 in which said first-named and second-named compounds are present in the floodwater in concentration ratios ranging from about 2:1 to 1:2.

6. A method according to claim 2 in which a small quantity of the diethanolamine salt of benzene sulfonic acid is incorporated in said floodwater.

7. A method according to claim 1 in which a portion of floodwater containing said condensation products is injected before injection of floodwater containing said alkaryl polyether alcohol.

8. A method according to claim 7 in which between 0.005 and 0.050% by weight of the first-named compounds and between 0.005 and 0.050% by weight of the second-named compounds are incorporated in the floodwater.

9. A method according to claim 7 in which the volume of floodwater containing each of said compounds is equal to about 50 times the pore volume of that portion of said formation which lies within the radius of about 5 feet from said input well.

10. A method according to claim 9 in which the first-named portion of flood water contains a small amount of the diethanolamine salt of benzene sulfonic acid.

11. A method according to claim 1 in which said fatty acids are coco fatty acids.

References Cited in the file of this patent

UNITED STATES PATENTS

| | | |
|---|---|---|
| 2,233,381 | De Groote et al. | Feb. 25, 1941 |
| 2,792,894 | Graham et al. | May 21, 1957 |
| 2,800,962 | Garst | July 30, 1957 |
| 2,874,779 | Johnson | Feb. 24, 1959 |
| 2,875,831 | Martin et al. | Mar. 3, 1959 |

OTHER REFERENCES

McCutcheon: "Surfactons Listed," Part 4, Soap and Chemical Specialties, p. 67, March 1958.